(12) United States Patent
Nelsen

(10) Patent No.: US 11,339,591 B2
(45) Date of Patent: May 24, 2022

(54) LATCH ASSEMBLY HAVING SELF RE-LATCHING FEATURE

(71) Applicant: GM Global Technology Operations LLC, Detroit, MI (US)

(72) Inventor: James N. Nelsen, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 720 days.

(21) Appl. No.: 16/273,821

(22) Filed: Feb. 12, 2019

(65) Prior Publication Data

US 2020/0256094 A1    Aug. 13, 2020

(51) Int. Cl.
| | | |
|---|---|---|
| E05B 83/24 | (2014.01) | |
| E05B 83/18 | (2014.01) | |
| E05B 83/16 | (2014.01) | |
| B62D 25/12 | (2006.01) | |

(52) U.S. Cl.
CPC ............ *E05B 83/243* (2013.01); *B62D 25/12* (2013.01); *E05B 83/16* (2013.01); *E05B 83/18* (2013.01); *E05B 83/24* (2013.01); *E05B 83/247* (2013.01); *Y10S 292/23* (2013.01); *Y10S 292/42* (2013.01); *Y10T 292/0994* (2015.04); *Y10T 292/108* (2015.04); *Y10T 292/1047* (2015.04); *Y10T 292/1078* (2015.04); *Y10T 292/1082* (2015.04); *Y10T 292/1092* (2015.04)

(58) Field of Classification Search
CPC ......... Y10T 292/0994; Y10T 292/1092; Y10T 292/1047; Y10T 292/108; Y10T 292/1082; Y10T 292/1078; Y10S 292/23; Y10S 292/14; Y10S 292/42; E05B 83/16; E05B 83/18; E05B 83/243; E05B 83/24; E05B 83/247; E05B 81/00; E05B 81/04; E05B 81/32; E05B 85/00
See application file for complete search history.

(56) References Cited

U.S. PATENT DOCUMENTS

| | | | | | |
|---|---|---|---|---|---|
| 5,273,325 | A | * | 12/1993 | Zimmermann | ......... E05B 81/22 292/216 |
| 5,676,003 | A | * | 10/1997 | Ursel | ...................... E05B 81/42 292/201 |
| 6,428,058 | B1 | * | 8/2002 | Graute | .................... E05B 85/01 292/201 |

(Continued)

*Primary Examiner* — Christine M Mills
*Assistant Examiner* — Faria F Ahmad
(74) *Attorney, Agent, or Firm* — Vivacqua Crane, PLLC

(57) ABSTRACT

A latch assembly having primary position, a secondary position, and an unlatched position is disclosed. The latch assembly includes a striker and a retention member. A slot of the retention member is shaped to receive the striker when the latch assembly is in the primary position. The latch assembly includes a detent lever defining a catch configured to engage with the retaining feature of the retention member to secure the latch assembly in the secondary position. The latch assembly includes a linking member coupled to the detent lever, a memory lever moveable about a pivot axis, and a release lever. The memory lever defines a retention surface configured to engage with the linking member when the latch assembly is in the unlatched position. The release lever is rotatable about a shared axis of rotation and operatively connected to the memory lever when the latch assembly is in the unlatched position.

15 Claims, 9 Drawing Sheets

(56) References Cited

U.S. PATENT DOCUMENTS

| | | | | |
|---|---|---|---|---|
| 6,540,271 | B1* | 4/2003 | Kalsi | E05B 85/26 |
| | | | | 292/216 |
| 6,575,507 | B2* | 6/2003 | Reddmann | E05B 81/14 |
| | | | | 292/201 |
| 6,601,883 | B1* | 8/2003 | Kalsi | E05B 81/14 |
| | | | | 292/201 |
| 6,705,649 | B1* | 3/2004 | Reddmann | E05B 81/06 |
| | | | | 292/201 |
| 6,817,636 | B1* | 11/2004 | Evans | E05B 81/14 |
| | | | | 292/216 |
| 7,032,937 | B2* | 4/2006 | Boecker | E05B 81/14 |
| | | | | 292/201 |
| 7,234,736 | B2* | 6/2007 | Kachouh | E05B 81/14 |
| | | | | 292/201 |
| 7,946,634 | B2* | 5/2011 | Bendel | E05B 81/14 |
| | | | | 292/201 |
| 8,827,329 | B2* | 9/2014 | Scholz | E05B 85/26 |
| | | | | 292/216 |
| 9,016,734 | B2* | 4/2015 | Barth | E05B 85/243 |
| | | | | 292/226 |
| 9,057,211 | B2* | 6/2015 | Scholz | E05B 85/26 |
| 9,151,092 | B2* | 10/2015 | Scholz | E05B 85/26 |
| 9,243,429 | B2* | 1/2016 | Bendel | E05B 77/06 |
| 9,476,230 | B2* | 10/2016 | Margheritti | E05B 77/16 |
| 10,132,109 | B2* | 11/2018 | Bendel | E05B 85/26 |
| 10,941,592 | B2* | 3/2021 | Taurasi | E05B 77/08 |
| 2007/0138802 | A1* | 6/2007 | Stasko | E05B 79/20 |
| | | | | 292/201 |
| 2016/0186468 | A1* | 6/2016 | Ilea | E05B 81/14 |
| | | | | 292/201 |
| 2016/0340941 | A1* | 11/2016 | Taurasi | E05B 77/08 |
| 2018/0171679 | A1* | 6/2018 | Im | E05B 83/18 |

* cited by examiner

LATCH ASSEMBLY HAVING SELF RE-LATCHING FEATURE

INTRODUCTION

The present disclosure relates to a latch assembly. More particularly, the disclosure relates to a latch assembly for a closure that includes a re-latching feature.

A hood latch assembly for a vehicle typically includes both a primary latch and a secondary latch. The primary latch is usually connected to a hood release handle by a cable. A user actuates the hood release handle and unlatches or opens the primary latch. Alternatively, the user may also unlatch the primary latch by actuating an electronically controlled button. Once the primary latch is open, the hood is partially open and in an ajar position. However, the individual is unable to lift the hood into a fully opened position unless he or she also unlatches or opens the secondary latch as well. In other words, the hood of the vehicle is unable to lift into a fully opened position unless both the primary latch and the secondary latch are both unlatched.

An individual may lift the hood to perform various actions. For example, if the vehicle includes a rear-engine layout, then the hood may be lifted to place items into a front-loading truck. Alternatively, if the vehicle includes a front-engine layout, then an individual may lift the hood to inspect components in the engine bay. Once the individual is finished placing items in the front-loading truck or, alternatively, inspecting the engine bay, he or she may then lower the hood. However, sometimes the individual may inadvertently forget to re-latch the hood shut before operating the vehicle. Thus, the hood of the vehicle appears to be closed, but neither the primary latch or the secondary latch hold the hood shut.

There are various systems available to prevent the front hood from lifting up and into a position that may obstruct the driver's view as the vehicle is being driven. For example, some vehicles may provide a notification to the driver indicating the hood is not fully secured. However, sometimes the driver may decide to ignore the notification and continue to drive.

In another approach to prevent the hood from opening, the vehicle is provided with a system that re-engages a secondary hook that secures the hood into the partially open or ajar position. The secondary hook may be re-engaged once the transmission is shifted out of park or, alternatively once the vehicle is traveling at a specified speed. However, the system for re-engaging the secondary latch may be relatively expensive, complicated, and may introduce unnecessary weight to the vehicle. Specifically, sometimes the system may require two separate actuators because the secondary hook is operated independently from the primary hook. Furthermore, the electronics required to control the additional actuator tend to be complex since two drive circuits are required, and one of the drive circuits needs to be bi-directional in order to move the additional actuator into two distinct positions.

Thus, while current hood latches achieve their intended purpose, there is a need for a new and improved hood latch that prevents the hood from lifting while the vehicle is driven.

SUMMARY

According to several aspects, a latch assembly having primary position, a secondary position, and an unlatched position is disclosed. The latch assembly includes a striker and a retention member defining a retaining feature and a slot. The slot of the retention member is shaped to receive the striker when the latch assembly is in the primary position. The latch assembly also includes a detent lever defining a catch that is configured to engage with the retaining feature of the retention member to secure the latch assembly in the secondary position. The latch assembly also includes a linking member coupled to the detent lever and a memory lever moveable about a pivot axis. The memory lever defines a retention surface configured to engage with the linking member when the latch assembly is in the unlatched position. Engagement between the retention surface of the memory lever and the linking member prevents the catch of the detent lever from engaging with the retaining feature of the retention member to actuate the latch assembly into the secondary position. The latch assembly also includes a release lever rotatable about a shared axis of rotation and operatively connected to the memory lever when the latch assembly is in the unlatched position. Rotation of the release lever about the shared axis of rotation when the latch assembly is in the unlatched position moves the memory lever about the pivot axis and urges the linking member out of engagement with the retention surface of the memory lever to actuate the latch assembly into the secondary position.

In an aspect, the latch assembly further comprises a coupling that operably connects the release lever to the memory lever.

In another aspect, the memory lever defines a coupling feature that is configured to selectively engage with the coupling.

In yet another aspect, the coupling feature of the memory lever is configured to disengage with the coupling as the latch assembly actuates from the unlatched position and into the secondary position.

In an aspect, the coupling defines a first end and a second end. The first end of the coupling is rotatably connected to the release lever.

In another aspect, the second end of the coupling is a floating end.

In yet another aspect, the second end of the coupling defines a bypass feature that is shaped to selectively engage with the memory lever.

In an aspect, the detent lever defines a leg and the retention member defines a pin.

In another aspect, the leg of the detent lever engages with the pin of the retention member as the latch assembly is actuated out of the primary position and into the secondary position.

In yet another aspect, the memory lever defines an arcuate surface shaped to correspond with a sliding surface of the retention member.

In an aspect, the arcuate surface of the memory lever engages with the sliding surface of the retention member when the latch assembly is in the primary position.

In an aspect, latch assembly for securing a hood of a vehicle, the latch assembly having primary position, a secondary position, and an unlatched position is disclosed. The latch assembly includes a release cable and a striker located along an underside of the hood of the vehicle. The latch assembly also includes a retention member defining a retaining feature and a slot. The slot of the retention member is shaped to receive the striker when the latch assembly is in the primary position. The latch assembly also includes a detent lever defining a catch configured to engage with the retaining feature of the retention member to secure the latch assembly in the secondary position. The latch assembly also includes a linking member coupled to the detent lever and a memory lever moveable about a pivot axis. The memory lever defines a retention surface configured to engage with the linking member when the latch assembly is in the unlatched position. Engagement between the retention surface of the memory lever and the linking member prevents the catch of the detent lever from engaging with the retaining feature of the retention member to actuate the latch assembly into the secondary position. The latch assembly also includes a release lever connected to the release cable and rotatable about a shared axis of rotation. The release lever is operatively connected to the memory lever when the latch assembly is in the unlatched position, where rotation of the release lever about the shared axis of rotation when the latch assembly is in the unlatched position moves the memory lever about the pivot axis and urges the linking member out of engagement with the retention surface of the memory lever to actuate the latch assembly into the second position. The latch assembly also includes a coupling operably connecting the detent lever to the release lever.

In another aspect, the latch assembly further comprises an actuator, where the release cable operably connects the actuator to the latch assembly.

In yet another aspect, the latch assembly further comprises a control module in electronic communication with the actuator.

In one aspect, the control module executes instructions to receive as input one or more positional signals indicating a position of both the retention member and the detent lever. The control module further executes instructions to determine that the retention member and the detent lever are not engaged with one another and the hood is lowered into an ajar position but is unsecured based on the one or more position signals. In response to determining the retention member and the detent lever are not engaged with one another, the control module determines the latch assembly is in the unlatched position.

In another aspect, the control module executes instructions to receive one or more signals indicating the vehicle is about to be driven. The control module executes instructions to determine the vehicle is about to be driven based on the one or more signals. In response to determining the latch assembly is in the unlatched position and that the vehicle is about to be driven, the control module instructs the actuator to pull on the release cable.

In yet another aspect, the memory lever defines a coupling feature that is configured to selectively engage with the coupling.

In an aspect, the coupling feature of the memory lever is configured to disengage with the coupling as the latch assembly actuates from the unlatched position and into the secondary position.

In another aspect, the coupling defines a first end and a second end, where the first end of the coupling is rotatably connected to the release lever and the second end of the coupling is a floating end.

In yet another aspect, the second end of the coupling defines a bypass feature that is shaped to selectively engage with the memory lever.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
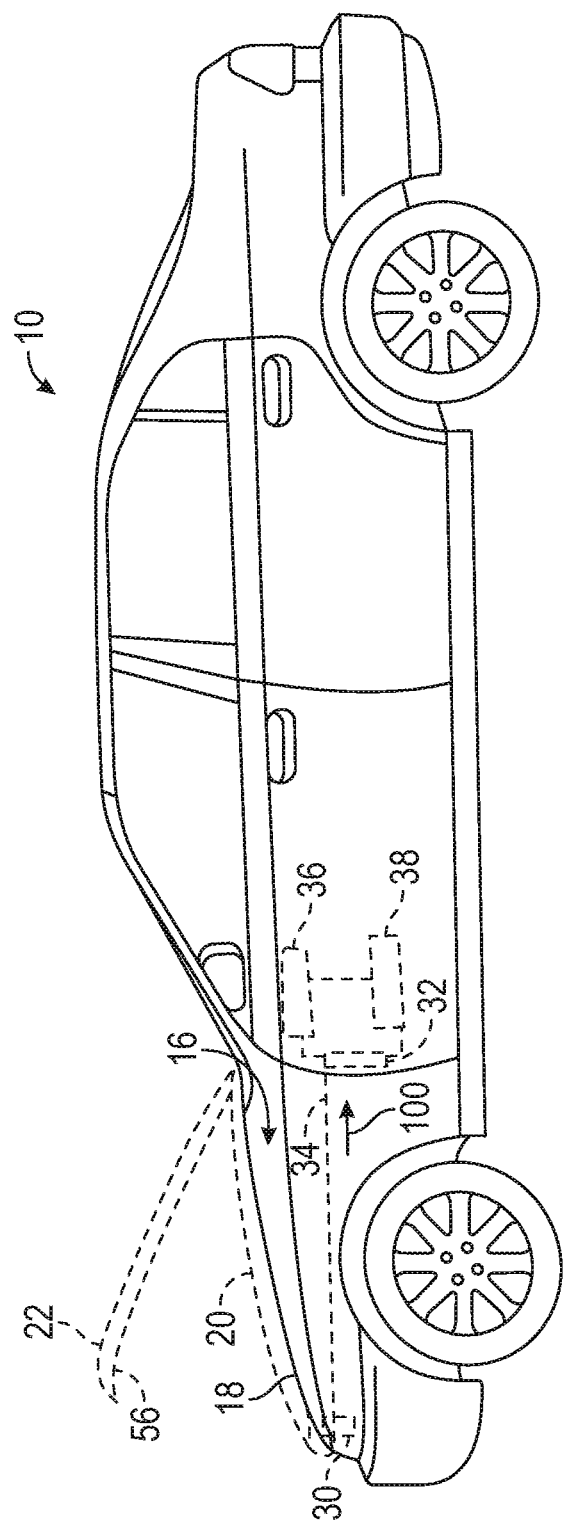
FIG. 1 is a side view of a vehicle including a latch assembly and a hood, where the latch assembly secures the hood according to an exemplary embodiment.

Referring to FIG. 1, an exemplary vehicle 10 is shown. In one non-limiting embodiment, the vehicle 10 is an automobile such as, for example, a sport utility vehicle, a sedan, or van. The vehicle 10 includes a front compartment 16 and a hood 18. The hood 18 provides closure to the front compartment 16. In one example, the front compartment 16 may be an engine compartment. Alternatively, in another example, the front compartment 16 is a front-loading trunk, which is sometimes referred to as a frunk. FIG. 1 illustrates the hood 18 shut in a closed position. The hood 18 is also shown in dashed lines in an ajar position 20 and in a fully opened position 22. The vehicle 10 includes a latch assembly 30 configured to selectively secure the hood 18 shut or in the ajar position 20. As explained below, the latch assembly 30 includes a self re-latching feature.

Although FIG. 1 illustrates the latch assembly 30 securing the hood 18 of the vehicle 10, it is to be appreciated the latch assembly 30 may be used in other types of closures such as, for example, a liftgate, a hatch door, or a trunk of a vehicle. Furthermore, although FIG. 1 illustrates the latch assembly 30 employed in an automobile, it is to be appreciated that the latch assembly 30 may be used in a variety of other applications as well and is not limited to automobiles. For example, in another embodiment, the latch assembly 30 is employed in a semi-truck, off-road vehicle, marine vehicle, or an aircraft.

In the non-limiting embodiment as shown, a hood release selector 32 and an actuator 36 are both operably connected to the latch assembly 30 by a release cable 34. The actuator 36 is in electronic communication with one or more control modules 38, where the control module 38 executes instructions for controlling operation of the actuator 36. The hood release selector 32 may be, for example, a button, switch, lever, or any other selection device configured to receive input from a user. When the hood release selector 32 receives a user input, the latch assembly 30 actuates from a primary position (seen in FIG. 2) and into a secondary position (seen in FIG. 7), and is subsequently actuated into a fully opened position seen in FIG. 9. It is to be appreciated that while the vehicle 10 illustrates an electronically controlled actuator 36, the latch assembly 30 may also be used in manual systems as well where the actuator 36 and the control module 38 are omitted. In a manual system, the release cable 34 is actuates based on user input received from the hood release selector 32.

The primary position represents a fully latched or closed position of the latch assembly 30, which corresponds to the hood 18 in the fully closed position. The secondary position of the latch assembly 30 represents a partially latched position and corresponds to the ajar position 20 of the hood 18. The hood 18 is unable to raise into the fully opened position 22 when the latch assembly 30 is in either the primary position or the secondary position. In addition to the primary position and the secondary position, the latch assembly 30 also includes a fully opened position (seen in FIG. 10B) and an unlatched position (seen in FIG. 9). The fully opened position of the latch assembly 30 corresponds to the fully opened position 22 of the hood 18. The unlatched position of the latch assembly 30 corresponds to the hood 18 resting against the open latch assembly 30. That is, when the latch assembly 30 is in the unlatched position the hood 18 is not secured and may be lifted up and into the fully opened position 22.

Figure 2:
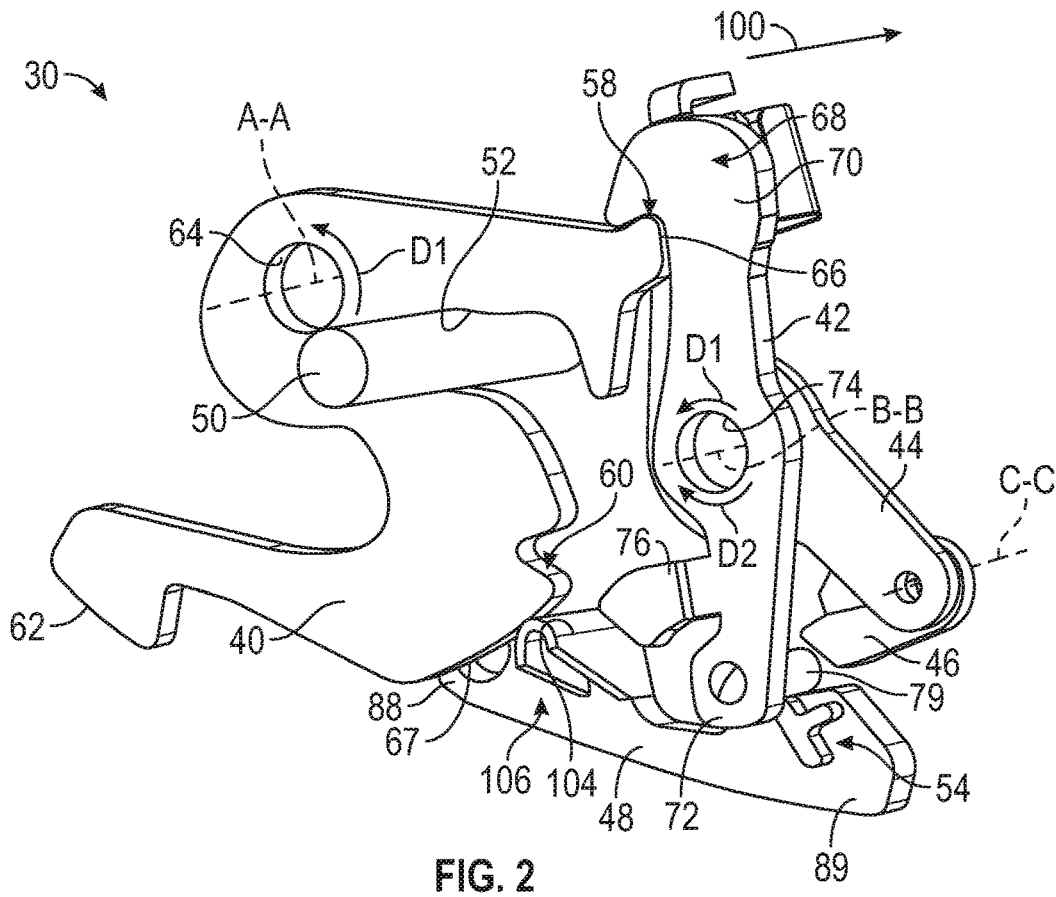
FIG. 2 is a perspective view of the disclosed latch assembly in a primary position according to an exemplary embodiment.
Figure 7:
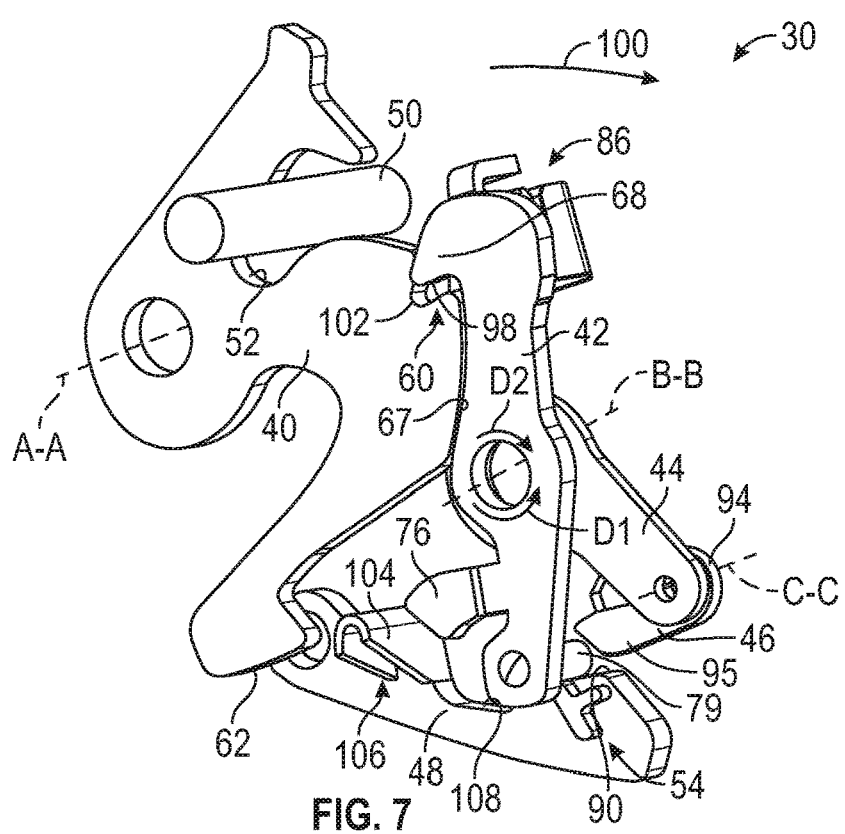
FIG. 7 is an illustration of the latch assembly in a secondary position according to an exemplary embodiment.
Figure 9:
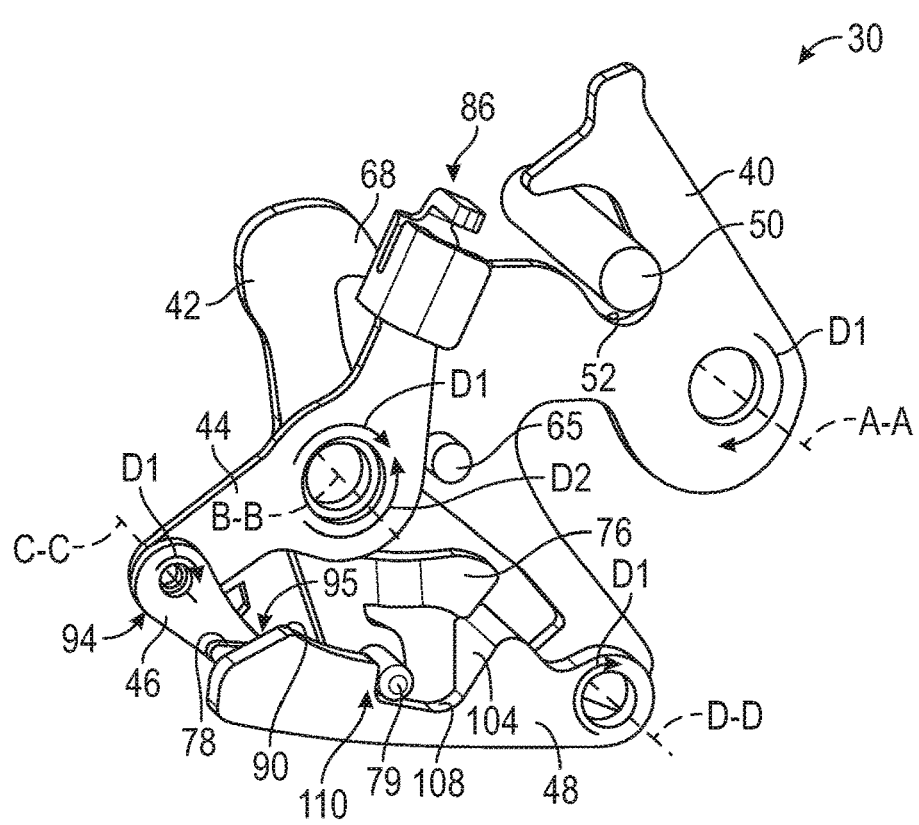
FIG. 9 illustrates the latch assembly in an unlatched position, which is prior to the hood in FIG. 1 being lifted into the fully opened position according to an exemplary embodiment.

Sometimes a user may attempt to shut the hood 18 by pushing the hood 18 downwardly until the hood 18 contacts the latch assembly 30. However, he or she may inadvertently forget to re-latch the latch assembly 30 back into the primary position as seen in FIG. 2 or the secondary position as seen in FIG. 7. Instead, the hood 18 is lowered but the latch assembly 30 remains in the unlatched position as seen in FIG. 9. Alternatively, the user may release the hood 18 from the interior of the vehicle 10 and then forgets to lift the hood 18 up and into the fully opened position 22. Accordingly, the hood 18 is not secured. Thus, as the vehicle 10 is driven, air may lift the hood 18 up and into the fully opened position 22.

As explained below, the latch assembly 30 includes a self re-latching feature that prevents the hood 18 from being lifted upwards as the vehicle 10 is driven. Specifically, the latch assembly 30 is actuated from the unlatched position seen in FIG. 9 and into the secondary position seen in FIG. 7. The hood 18 is unable to lift upwardly into the fully opened position 22 when the latch assembly 30 is in the second position.

FIG. 2 is a perspective view of the latch assembly 30 in the primary position. It is to be appreciated that for purposes of clarity and simplicity, the figures do not illustrate various components of the latch assembly 30 such as, but not limited to, a frame plate, backing plate, pivot bearings, and various springs or biasing members. The latch assembly 30 includes a retention member 40, a detent lever 42, a release lever 44, a coupling 46, a memory lever 48, and a striker 50, where the striker 50 is attached to the hood 18 of the vehicle 10 (FIG. 1). As explained in greater detail below, the coupling 46 operably connects the release lever 44 to the memory lever 48 when the latch assembly 30 is in the unlatched position (seen in FIG. 9). The memory lever 48 defines a coupling feature 54 configured to selectively engage and disengage with the coupling 46. Specifically, the coupling feature 54 of the memory lever 48 is configured to disengage with the coupling 46 as the latch assembly 30 actuates from the unlatched position as seen in FIG. 9 and into the secondary position (seen in FIG. 7), which is described in greater detail below.

In the embodiment as shown, the retention member 40 is a fork bolt that defines a throat or slot 52. The slot 52 of the retention member 40 is shaped to receive a striker 50 when the latch assembly 30 is in the primary position. Referring to both FIGS. 1 and 2, in an embodiment the striker 50 is located along an underside 56 of the hood 18. However, it is to be appreciated that in an alternative embodiment the retention member 40, the detent lever 42, the release lever 44, the coupling 46, and the memory lever 48 may be located along the underside 56 of the hood 18 instead. When the latch assembly 30 is in the primary position, the striker 50 is engaged with the retention member 40. More specifically, the striker 50 is received within the slot 52 of the retention member 40, which thereby retains the hood 18 in the closed position.

In addition to the slot 52, the retention member 40 defines a primary shoulder 58, a secondary shoulder 60, a support surface 62, an aperture 64, an elongated member or pin 65 (seen in FIG. 5), and a sliding surface 67. The primary shoulder 58 and the secondary shoulder 60 may also be referred to as retaining features (i.e., a first retaining feature and a second retaining feature). As explained below, the pin 65 of the retention member 40 is optional. The aperture 64 is located at a rotational axis A-A of the retention member 40 and is shaped to receive a pin (not shown). A biasing element (not shown) is located around the pin and is configured to exert a biasing force in a first rotational direction D1 against the retention member 40. The biasing element may be, for example, a torsion spring. In the non-limiting embodiment as shown, the first rotational direction D1 is oriented in the counterclockwise direction. As explained below, the biasing force exerted by the biasing element urges the retention member 40 to rotate in the first rotational direction D1 about the axis A-A and into the secondary position (seen in FIG. 7).

The primary shoulder 58 of the retention member 40 defines a surface 66. When the latch assembly 30 is in the primary position, the detent lever 42 abuts against the surface 66 of the primary shoulder 58 defined by the retention member 40. Specifically, in the embodiment as illustrated, the detent lever 42 defines a catch 68 that is shaped to correspond to the primary shoulder 58 of the retention member 40. As seen in FIG. 7, the catch 68 of the detent lever 42 is also shaped to correspond to the secondary shoulder 60 of the retention member 40 as well. The catch 68 is configured to engage with the secondary shoulder 60 (which is also referred to as the secondary retaining feature) of the retention member 40, which in turn secures the latch assembly 30 in the secondary position. Referring back to FIG. 2, in an embodiment the catch 68 may define a hook-shaped profile. However, it is to be appreciated that the detent lever 42 is not limited to the specific profile as shown in the figures, and the catch 68 may include a variety of other profiles.

The detent lever 42 also defines a first end 70, a second end 72, an aperture 74 located between the first and second ends 70, 72, a projection which is referred to as leg 76, and a linking member 79. The leg 76 extends outward in a direction that is angled relative to the remaining portion of the detent lever 42. As explained below, in an embodiment the leg 76 of the detent lever 42 may be optional. The catch 68 is disposed at the first end 70 of the detent lever 42 and the leg 76 is disposed at the second end 72 of the detent lever 42. The aperture 74 is located at a shared axis of rotation B-B of the detent lever 42 and is shaped to receive a pin (not shown). A biasing element (not shown) is located around the pin and is configured to exert a biasing force in the first rotational direction D1. The leg 76 is located between the axis of rotation B-B and the second end 72 of the detent lever 42.

Figure 3:
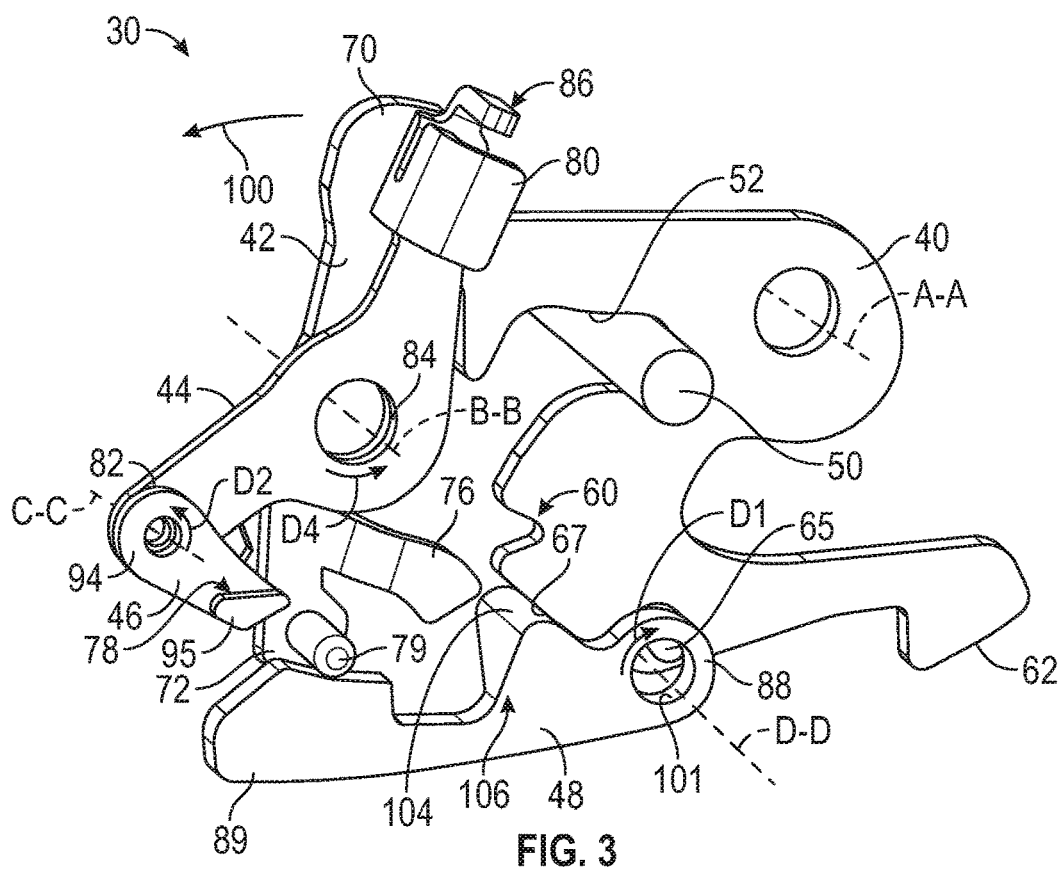
FIG. 3 illustrates the opposite side of the latch assembly shown in FIG. 2 according to an exemplary embodiment.

FIG. 3 is a view of an opposing side of the latch assembly 30. Referring to FIGS. 1 and 3, the release lever 44 of the latch assembly 30 is connected to the release cable 34. Specifically, in the embodiment as shown, the release lever 44 defines a first end 80, a second end 82, and an aperture 84 located between the first and second ends 80, 82. An attachment feature 86 is located on the first end 80 of the release lever 44. The attachment feature 86 of the release lever 44 is configured to secure a ball end (not shown) of the release cable 34. It is to be appreciated that a variety of cable ends or attachment features may be used to connect with the release lever 44 such as, but not limited to, barrel end, rod ends, or clips. The aperture 84 of the release lever 44 is located at the shared axis of rotation axis B-B, where both the detent lever 42 and the release lever 44 both rotate about the axis B-B.

The coupling 46 is rotatably attached to the second end 82 of the release lever 44. Specifically, the coupling 46 is configured to rotate about an axis C-C located on the second end 82 of the release lever 44. A biasing member (not illustrated) is configured to exert a biasing force against the coupling 46 in a second rotational direction D2, which is opposite to the first rotational direction D1. It is to be appreciated that the coupling 46 operates as a floating coupling. Specifically, the coupling 46 defines a fixed first end 94 and a floating second end 95. The first end 94 of the coupling 46 is rotatably attached to the second end 82 of the release lever 44 and is fixed in place. In contrast, the second end 95 of the coupling 46 is a floating end that is not permanently attached to another component of the latch assembly 30. Referring to FIGS. 11-14, the second end 95 of the coupling 46 includes one or more bypass features 78 that are configured to selectively engage with the coupling feature 54 of the memory lever 48, which is explained in greater detail below.

Figure 4:
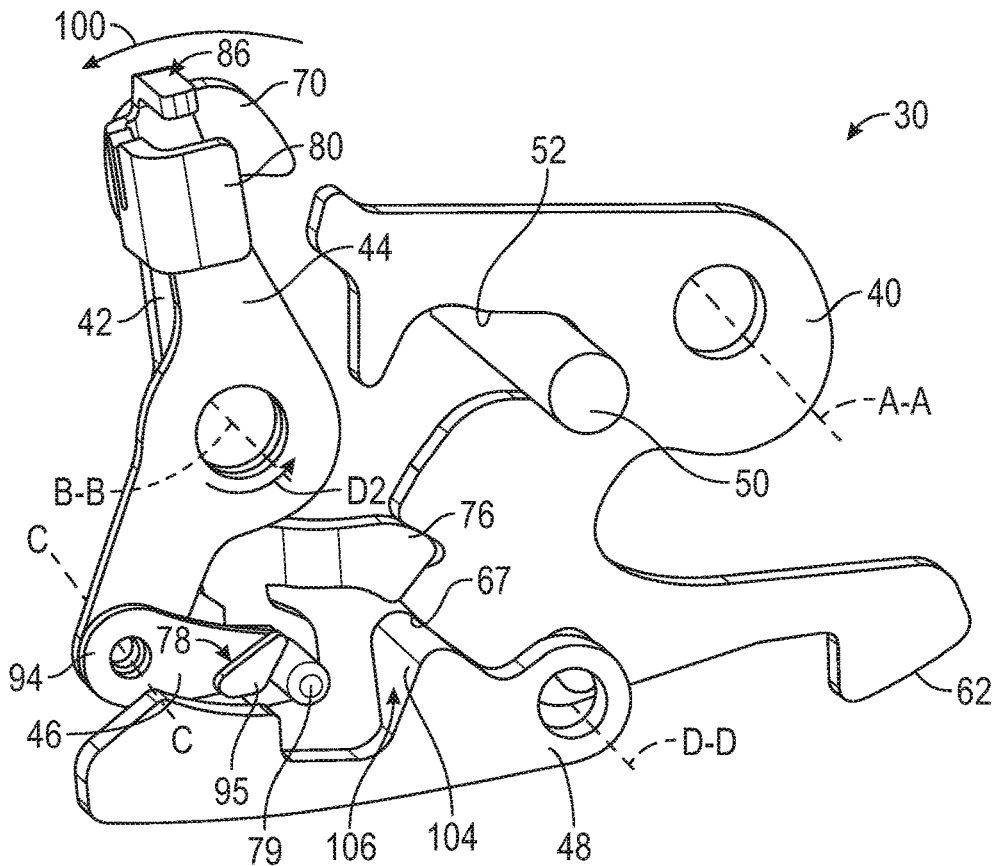
FIG. 4 illustrates the latch assembly being pulled back from the primary position by a release cable shown in FIG. 1 according to an exemplary embodiment.

Referring back to FIG. 3, the memory lever 48 includes a first end 88 and a second end 89. The memory lever 48 is configured to move or rotate about a pivot axis D-D. As seen in FIG. 4, the pivot axis D-D is located at the first end 88 of the memory lever 48. The memory lever 48 also defines an aperture 101 located at the rotational axis A-A, where the aperture 101 is shaped to receive a pin (not shown). A biasing element (not shown) is configured to exert a biasing force in the first rotational direction D1. When the latch assembly 30 is in the primary position, the linking member 79 of the detent lever 42 abuts against the memory lever 48, and thereby prevents the memory lever 48 from rotating in the first rotational direction D1 about the pivot axis D-D.

The linking member 79 is coupled to the detent lever 42. In the non-limiting embodiment as shown, the linking member 79 of the detent lever 42 is shaped as an elongated member or pin. However, it is to be appreciated that the figures illustrate only one example of the linking member 79, and the elongated profile of the linking member 79 may include a trapezoidal or square profile in another embodiment. In the embodiment as shown, the linking member 79 is part of the detent lever 42. However, it is to be appreciated that the linking member 79 may be separate part instead. For example, the linking member 79 is formed as a single piece using powder metal or as a semi-piercing in a progressive fine block die.

The second end 89 of the memory lever 48 selectively engages with the floating second end 95 of the coupling 46. Specifically, the coupling feature 54 (visible in FIG. 2) is located at the second end 89 of the memory lever 48 and is configured to selectively engage with the bypass feature 78 (seen in FIGS. 11-14) of the coupling 46.

When the latch assembly 30 is in the primary position (i.e. when the hood 18 seen in FIG. 1 is closed and latched), then the memory lever 48 is engaged with the retention member 40. More specifically, the sliding surface 67 of the retention member 40 is shaped to slidingly engage with a memory feature 106 of the memory lever 48. The memory feature 106 defines a curved or arcuate surface 104 that is shaped to correspond with the curved profile of the sliding surface 67 of the retention member 40. The memory feature 106 of the memory lever 48 is configured to selectively engage with the retention member 40 based on the position of the latch assembly 30. The arcuate surface 104 of the memory feature 106 of the memory lever 48 is engaged with the retention member 40 when the latch assembly 30 is in the primary position, but is disengaged with the retention member 40 when the latch assembly 30 is in the secondary position (seen in FIG. 7) and in the unlatched position (FIG. 9).

Referring to FIG. 3, both the detent lever 42 and the release lever 44 rotate about the same axis (i.e., the shared axis of rotation B-B). Furthermore, both the detent lever 42 and the release lever 44 are biased in the first rotational direction D1 by one or more biasing elements (not shown). Referring to FIGS. 1-3, when the hood release selector 32 is actuated by a user, the release cable 34 is urged in a direction 100, which is oriented away from the latch assembly 30 and towards the hood release selector 32. Urging the release cable 34 in the direction 100 causes detent lever 42 and the release lever 44 to overcome the biasing force exerted by the one or more biasing elements. The detent lever 42 and the release lever 44 then rotate about the shared axis of rotation B-B in a second rotational direction D2, where the second rotational direction D2 is opposite the first rotational direction D1.

Figure 5:
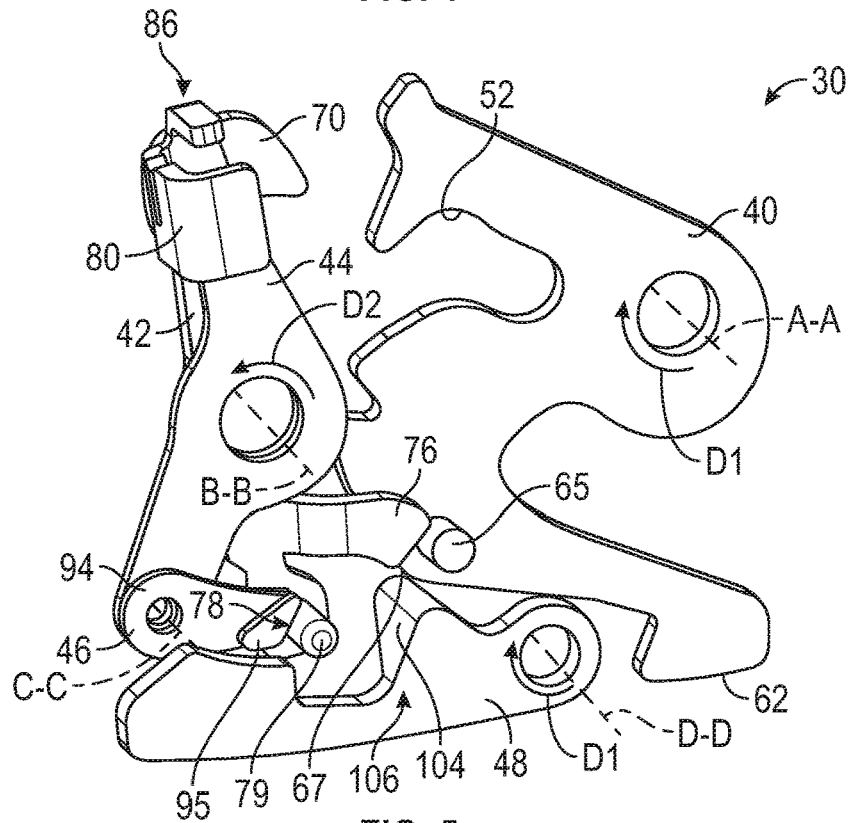
FIG. 5 is an illustration of the latch assembly in an intermediate position according to an exemplary embodiment.
Figure 6:
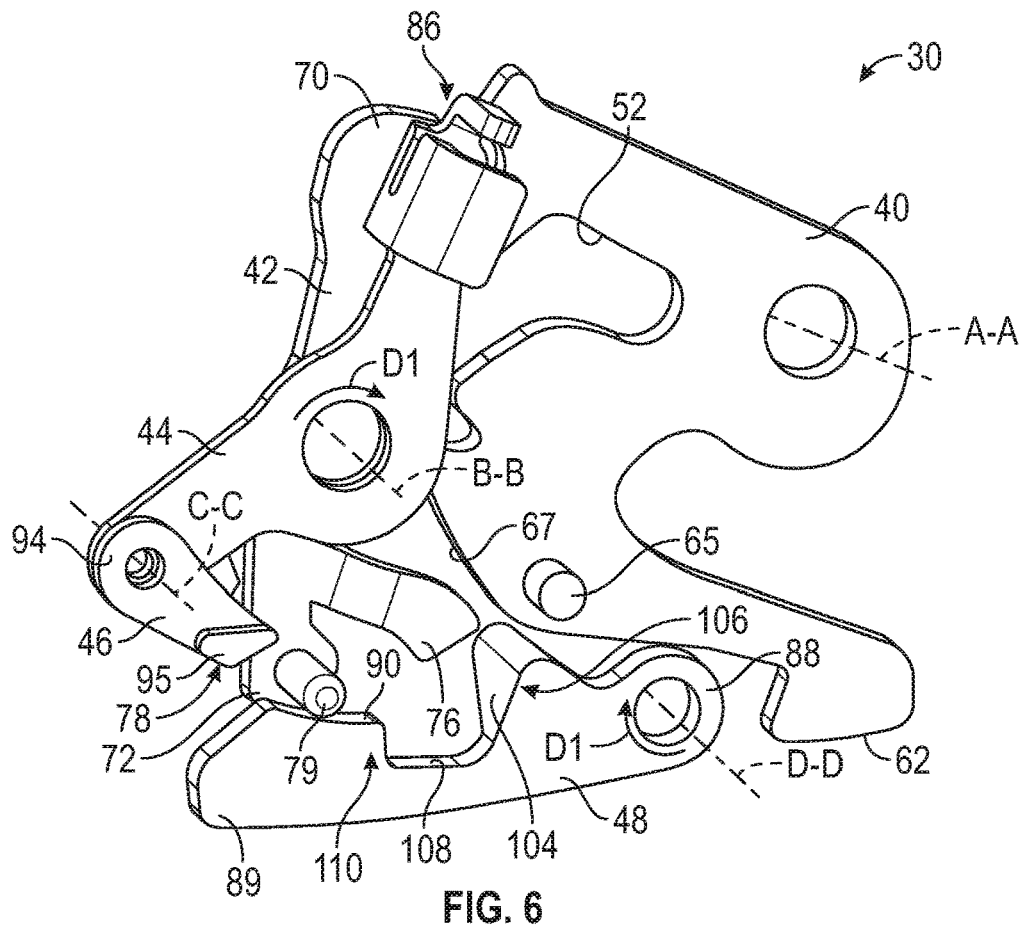
FIG. 6 illustrates a detent lever and a release lever of the latch assembly both rotating about a shared axis of rotation according to an exemplary embodiment.

FIGS. 4, 5, and 6 illustrate motion of the latch assembly 30 actuating from the primary position into the secondary position, where the secondary position is shown in FIG. 7. Specifically, the detent lever 42 and the release lever 44 are rotated around the shared axis of rotation B-B from the primary position (FIGS. 2 and 3) and are pulled back by the release cable 34 into the position as seen in FIG. 4. FIG. 5 is an illustration of the latch assembly 30 in an intermediate position where the detent lever 42 and the release lever 44 are both fully pulled back by the release cable 34. FIG. 6 illustrates the detent lever 42 and the release lever 44 both rotating in the first rotational position D1 and towards the secondary position, and FIG. 7 is an illustration of the latch assembly 30 in the secondary position.

FIG. 4 illustrates the latch assembly 30 being pulled out of the primary position by the release cable 34 (FIG. 1). Both the detent lever 42 and the release lever 44 are rotated about the axis B-B in the second rotational direction D2 by movement of the release cable 34 (FIG. 1). Referring to both FIGS. 3 and 4, the sliding surface 67 of the retention member 40 continues to engage with the arcuate surface 104 of the memory feature 106 of the memory lever 48. The engagement between the sliding surface 67 of the retention member 40 and the memory feature 106 of the memory lever 48 prevents the memory lever 48 from rotating about the pivot axis D-D in the first rotational direction, which thereby prevents the memory lever 48 from engaging with the linking member 79 of the detent lever 42.

With specific reference to FIG. 4, when the latch assembly 30 is urged out of the primary position, the coupling 46 abuts against upon the linking member 79 of the detent lever 42. Specifically, the second end 95 of the coupling 46 (i.e., the floating end) abuts against and engages with the linking member 79 of the detent lever 42 when urged out of the primary position.

FIG. 5 is an illustration of the latch assembly 30 in the intermediate position. That is, the detent lever 42 and the release lever 44 are both fully pulled back in the second rotational direction D2 by the release cable 34 (FIG. 1). It is to be appreciated that the striker 50 has been omitted from FIG. 5 but is still located within the slot 52 of the retention member 40. Referring to FIGS. 1 and 5, in some embodiments the latch assembly 30 is part of a double pull system. A double pull system requires the release cable 34 to pull on the release lever 44 twice before the latch assembly 30 is actuated into the unlatched position. Once the latch assembly 30 is in the unlatched position, air may travel underneath and pull the hood 18 up and into the fully opened position 22.

In order to prevent the latch assembly 30 from actuating into the unlatched position upon a first pull or actuation of the latch assembly 30 (i.e., the first time the release cable 34 pulls on the release lever 44), a portion of the retention member 40 engages with the detent lever 42. Specifically, the leg 76 of the detent lever 42 abuts against the pin 65 located along the retention member 40 after a first actuation or pull of the latch assembly 30 to prevent the latch assembly 30 from actuating into the unlatched position. The engagement between the retention member 40 and the detent lever 42 prevents the retention member 40 from rotating about the axis A-A in the first rotational direction D1 and into the unlatched position (seen in FIG. 9). Furthermore, as also seen in FIG. 5, the sliding surface 67 of the retention member 40 contacts the arcuate surface 104 of the memory lever 48. The contact between the retention member 40 and the memory lever 48 prevents the memory lever 48 from rotating about the pivot axis D-D and contacting the linking member 79 of the detent lever 42. It is to be appreciated that the leg 76 of the detent lever 42, the pin 65 of the retention member 40, or both the leg 76 and the pin 65 may be omitted if the latch assembly 30 is not part of a double pull system.

FIG. 6 illustrates the detent lever 42 and the release lever 44 rotating back in the first rotational direction D1, and towards the secondary position shown in FIG. 7. As the detent lever 42 returns to the secondary position, the linking member 79 of the detent lever 42 disengages with the second end 95 of the coupling 46. The linking member 79 of the detent lever 42 then slides against a raised engagement surface 90 of the memory lever 48. This contact between the detent lever 42 and the memory lever 48 prevents the memory lever 48 from engaging with the detent lever 42. The raised engagement surface 90 is located at the second end 89 of the memory lever 48.

FIG. 7 illustrates the latch assembly 30 in the secondary position. When the latch assembly 30 is in the secondary position, the striker 50 is not secured within the slot 52 of the retention member 40 like the primary position as shown in FIG. 2. Therefore, there is no engagement between the striker 50 and the slot 52 of the retention member 40 to prevent the hood 18 (FIG. 1) of the vehicle 10 from lifting into the fully opened position 22. Instead, the catch 68 of the detent lever 42 is engaged with the secondary shoulder 60 of the retention member 40, where the engagement between the detent lever 42 and the retention member 40 prevent the hood 18 from lifting up and into the fully opened position 22.

The secondary shoulder 60 of the retention member 40 is part of an opening that is shaped to correspond with a portion of the catch 68 of the detent lever 42. In the embodiment as shown, a surface 98 located along the catch 68 of the detent lever 42 does not abut against or contact an opposing surface 102 located along the secondary shoulder 60 of the retention member 40. This is due to manufacturing tolerances within the various components of the latch assembly 30 and the vehicle 10. However, it is to be appreciated that the surface 98 of the detent lever 42 and the surface 102 of the retention member 40 abut against and contact one another if the hood 18 is lifted upwardly (e.g., by airflow or when someone tries to lift up the hood 18). Thus, the contact between the surface 98 of the detent lever 42 and the surface 102 of the retention member 40 prevents the hood 18 from lifting into the fully opened position 22 (seen in FIG. 1). In other words, when the latch assembly 30 is in the secondary position the hood 18 is in the ajar position 20, but the engagement between the catch 68 of the detent lever 42 and the secondary shoulder 60 of the retention member 40 prevent the hood 18 from being lifted.

Figure 8:
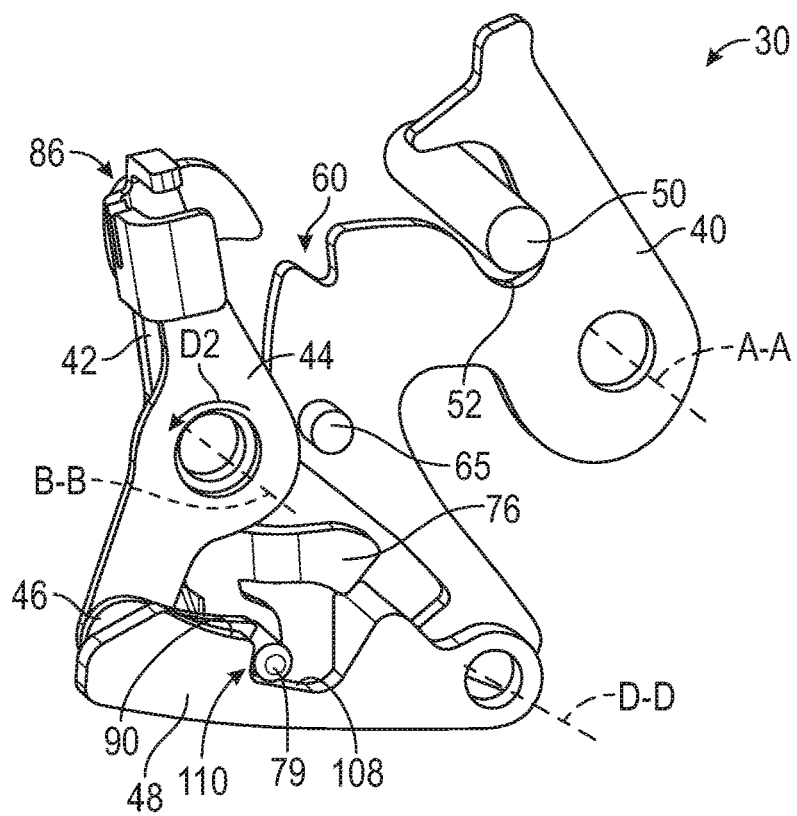
FIG. 8 illustrates the latch assembly being released from the secondary position according to an exemplary embodiment.
Figure 10A:
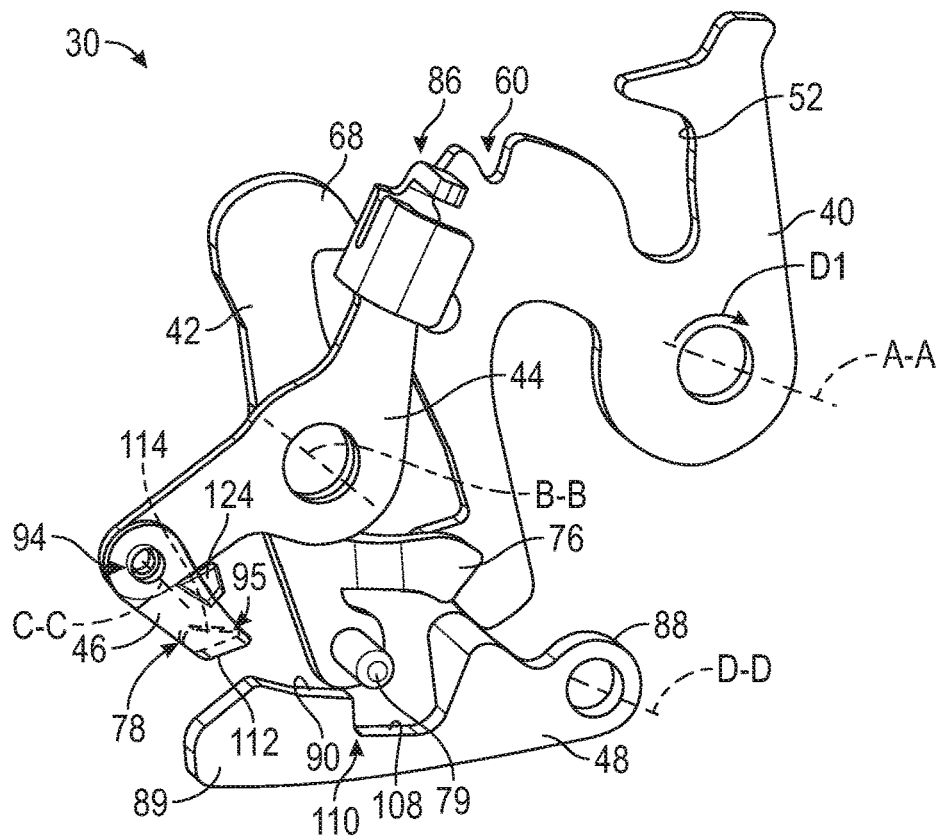
FIG. 10A illustrates the latch assembly as the hood is lifted into the fully opened position according to an exemplary embodiment.
Figure 10B:
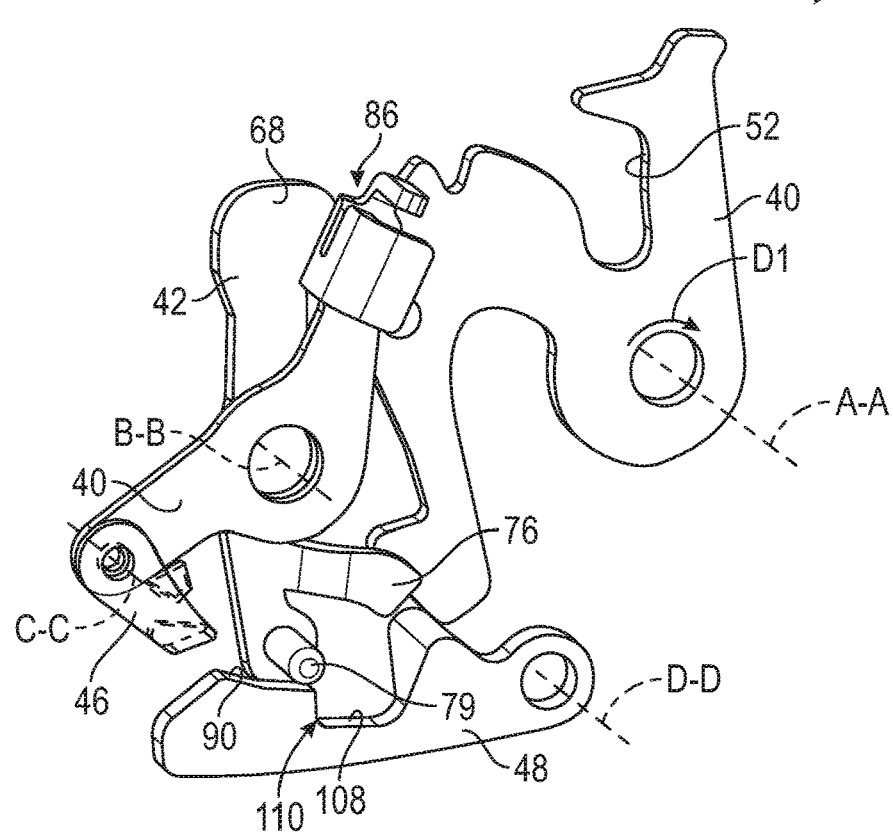
FIG. 10B illustrates the latch assembly when the hood is the fully opened position and is at rest according to an exemplary embodiment.

Referring to both FIGS. 1 and 7, once the latch assembly 30 is in the secondary position the release cable 34 may be urged in the direction 100 again to completely open or unlatch the latch assembly 30 so that the hood 18 may be lifted into the fully opened position 22 (FIG. 1). Urging the release cable 34 in the direction 100 causes detent lever 42 and the release lever 44 to overcome the biasing force exerted by the biasing element (not shown) located around the shared axis of rotation B-B. The detent lever 42 and the release lever 44 then rotate about the shared axis of rotation B-B in the second rotational direction D2. FIG. 8 illustrates the latch assembly 30 being pulled out of the secondary position, FIG. 9 illustrates the latch assembly in the unlatched position (prior to the hood 18 in FIG. 1 being lifted into the fully opened position 22), and FIGS. 10A and 10B illustrate the latch assembly 30 being lifted into the fully opened position.

Figure 11:
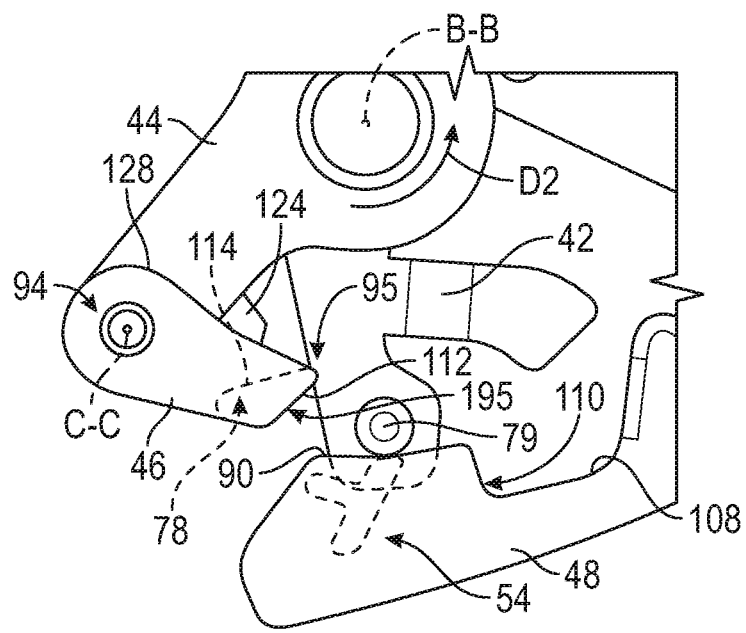
FIG. 11 is an enlarged view of a portion of the detent lever, the release lever, the coupling, and the memory lever in FIG. 8 according to an exemplary embodiment.

FIG. 8 illustrates both the detent lever 42 and the release lever 44 being rotated about the axis B-B in the second rotational direction D2 by movement of the release cable 34 (FIG. 1). In other words, the detent lever 42 and the release lever 44 are being pulled back by the release cable 34 (FIG. 1). FIG. 11 is an enlarged view of a portion of the detent lever 42, the release lever 44, the coupling 46, and the memory lever 48 in the secondary position shown in FIG. 7. The bypass feature 78 of the coupling 46 defines a first ramped surface 112 and a second ramped surface 114. The first ramped surface 112 of the bypass feature 78 is located along an outermost end 195 of the coupling 46. The first ramped surface 112 and the second ramped surface 114 of the bypass feature 78 of the coupling 46 are both configured to selectively engage with the coupling feature 54 of the memory lever 48 as explained below.

Referring to FIGS. 7, 8, and 11, the memory lever 48 defines the raised engagement surface 90, a lowered engagement surface 108, and a step 110. The step 110 separates the raised engagement surface 90 with the lowered engagement surface 108 of the memory lever 48. As the latch assembly 30 is pulled back from the secondary position, both the detent lever 42 and the release lever 44 are rotated about the axis B-B in the second rotational direction D2. As the detent lever 42 and the release lever 44 are pulled back, the first ramped surface 112 located along the second end 95 of the coupling 46 approaches and eventually abuts against the linking member 79 of the detent lever 42. The coupling 46 exerts a force upon the linking member 79 of the detent lever 42 that is sufficient to urge or push the linking member 79 of the detent lever 42 off of the raised engagement surface 90, and into the position seen in FIG. 12.

Figure 12:
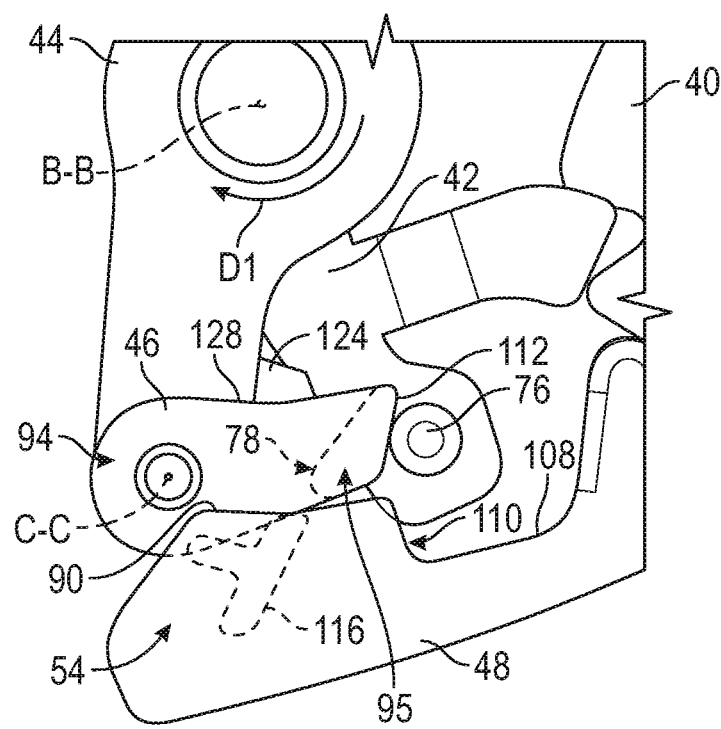
FIG. 12 is another enlarged view of the detent lever, the release lever, the coupling, and the memory lever, where an end of the coupling abuts against a pin of the detent lever according to an exemplary embodiment.
Figure 13:
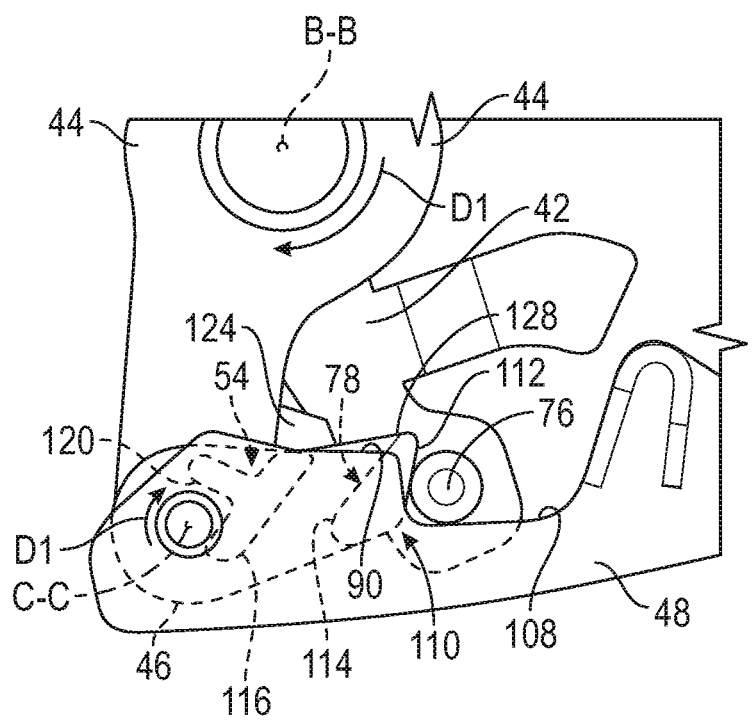
FIG. 13 is yet another enlarged view of the detent lever, the release lever, the coupling, and the memory lever, where the pin of the detent lever abuts against the memory lever according to an exemplary embodiment.

FIG. 12 is an enlarged view of the detent lever 42, the release lever 44, the coupling 46, and the memory lever 48, where the linking member 79 of the detent lever 42 has been urged off the engagement surface 90 of the memory lever 48. Now the linking member 79 rests or abuts against the lowered engagement surface 108 of the memory lever 48 (FIG. 13). Referring to FIGS. 7, 8, 11 and 12, after the first ramped surface 112 of the coupling 46 abuts the linking member 79 of the detent lever 42, the memory lever 48 lifts or is raised until the linking member 79 abuts against or otherwise contacts the lower engagement surface 108 of the memory lever 48 (seen in FIG. 13). Because the lower engagement surface 108 of the memory lever 48 is positioned in a location that is below the raised engagement surface 90 of the memory lever 48, this causes the coupling 46 to also be lowered relative to the memory lever 48, and into the position as seen in FIGS. 8 and 13 (FIG. 13 is an enlarged view of the coupling 46 and the linking member 79 of the detent lever 42 in FIG. 8).

Referring specifically to FIG. 13, as the release lever 44 rotates in the first rotational direction D1, the first ramped surface 112 of the bypass feature 78 of the coupling 46 slides off the linking member 79 of the detent lever 42. The coupling 46 may then rotate or move in concert with the release lever 44 until the second ramped surface 114 of the bypass feature 78 abuts against the coupling feature 54 on the memory lever 48. More specifically, the second ramped surface 114 of the coupling 46 abuts against a corresponding angled surface 116 that is part of the coupling feature 54 of the memory lever 48. The release lever 44 continues to rotate in the direction D1, which in turn causes the second ramped surface 114 of the bypass feature 78 of the coupling to slide off the corresponding angled surface 116 of the coupling feature 54 of the memory lever 48. The second ramped surface 114 of the bypass feature 78 of the coupling 46 may then engage with a ledge 120 of the notched bypass feature 78 located on the memory lever 48, which is seen in FIG. 14.

Specifically, the biasing element located around axis C-C (not shown) exerts a biasing force in the second rotational direction D2, which in turn causes the second ramped surface 114 of the bypass feature 78 to engage with the ledge 120 of the memory lever.

Figure 14:
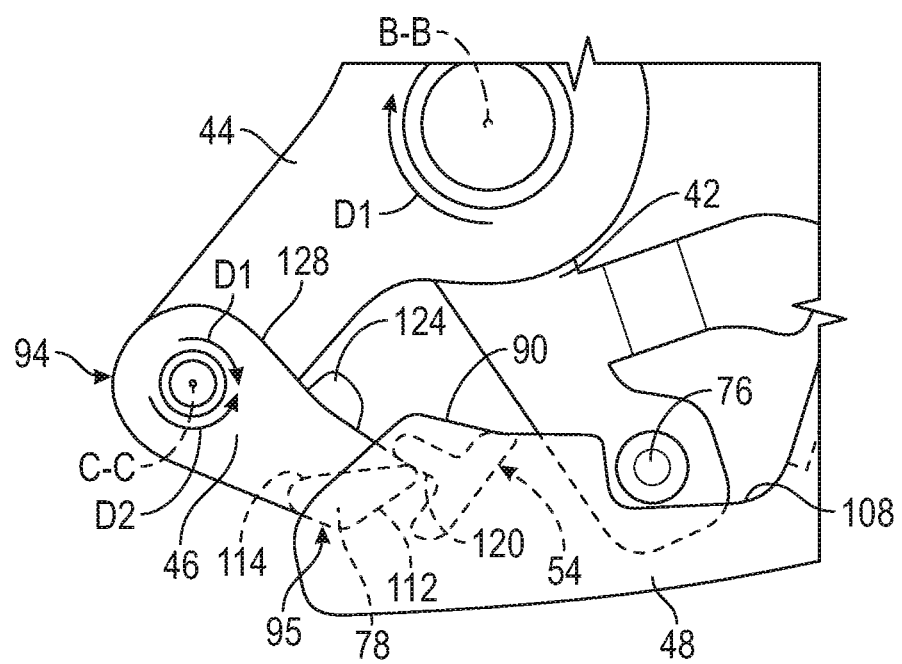
FIG. 14 is an enlarged view of the detent lever, the release lever, the coupling, and the memory lever, where a bypass feature of the coupling engages with the memory lever according to an exemplary embodiment.

Referring to FIGS. 12-14, in one embodiment the coupling 46 further includes a stop 124. The stop 124 is located between the first end 94 and the second end 95 of the coupling 46 and is positioned along an upper edge 128 of the coupling 46. The stop 124 projects outward from the upper edge 128 of the coupling 46. The stop 124 is configured to selectively prevent movement of the coupling 46 around the axis C-C in the second rotational direction D2. Referring specifically to FIG. 12, the stop 124 is configured to prevent further rotation of the coupling 46 about the axis C-C in the second rotational direction D2 when the first ramped surface 112 of the bypass feature 78 abuts against the linking member 79 of the detent lever 42.

FIGS. 10A and 10B illustrate the latch assembly 30 in the fully opened position, where FIG. 10A illustrates the latch assembly 30 as the hood 18 is being lifted, and FIG. 10B illustrates the latch assembly 30 when the hood 18 is at rest. Referring to FIGS. 9, 10A and 10B, as the hood 18 (FIG. 1) is lifted, the striker 50 is completely removed out of the slot 52 of the retention member 40. The movement of the striker 50 from the slot 52 of the retention member 40 urges the retention member 40 to rotate about the axis A-A in the first rotational direction D1 and into the fully opened position in FIGS. 10A and 10B. Specifically, the support surface 62 of the retention member 40 makes contact with the arcuate surface 104 of the memory lever 48, thereby urging the memory lever 48 to rotate in the second rotational direction D2. Therefore, the linking member 79 of the detent lever 42 is urged off the lower engagement surface 108 and then abuts against the engagement surface 90 (seen in FIG. 10B). Referring to FIGS. 10A, 10B, and 14, as the latch assembly 30 is actuated into the fully opened position, the second ramped surface 114 of the bypass feature 78 then slides off the ledge 120 of the coupling feature 54 of the memory lever 48, and into the free position seen in FIGS. 10A and 10B. The latch assembly is now in the fully open position (i.e., the hood 18 is completely raised up and is in the fully opened position 22).

Referring to both FIGS. 1, 10A, and 10B, when the hood 18 is in the fully opened position, a user now has access to the front compartment 16 of the vehicle 10. It is to be appreciated that the striker 50 is not visible in FIGS. 10A and 10B because the hood 18 is completely raised. It is also to be appreciated that when the latch assembly 30 is in the open fully opened position, the memory lever 48 is no longer in engagement with the retention member 40 or with the coupling 46. As mentioned above, sometimes a user may not re-latch or close the latch assembly 30 back into the primary position as seen in FIGS. 2 and 3. Instead, the latch assembly 30 is placed back into the unlatched position as seen in FIG. 9

Referring now to FIG. 9, when the latch assembly 30 is in the unlatched position, the detent lever 42 is not engaged with the retention member 40. However, the linking member 79 of the detent lever 42 is engaged with the memory lever 48. Specifically, the linking member 79 of the detent lever 42 abuts against or is in engaged with the lower engagement surface 108 of the memory lever 48. Moreover, as seen in FIG. 14, the second ramped surface 114 of the bypass feature 78 of the coupling 46 engages with the ledge 120 of the notched bypass feature 78 located on the memory lever 48.

Referring to FIGS. 1, 9, and 14, when the latch assembly 30 is in the unlatched position the hood 18 may still be lifted. Therefore, the disclosed latch assembly 30 includes a self re-latching feature that prevents a driver from operating the vehicle 10 with the hood 18 unsecured. Specifically, the latch assembly 30 self re-latches back into the secondary position in response to determining the vehicle 10 is shifted out of the park (P) gear position or, alternatively, in response to the vehicle 10 reaching a threshold speed. In one non-limiting embodiment, the threshold speed is about 3 kilometers/hour. The control module 38 instructs the actuator 36 to pull the release cable 34, which in turn causes the latch assembly 30 to actuate into the secondary position, which is explained below.

The control module 38 is a non-generalized, electronic control device having one or more preprogrammed digital computers or processors, memory or non-transitory computer readable medium coupled to one or more processors used to store data such as control logic, instructions, image data, lookup tables, etc., and a plurality of input/output peripherals or ports. The processor of the control module is configured to execute the control logic or instructions.

The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted. One or more data structures may also reside in memory, and may be used by the processor, operating system, or application to store or manipulate data.

The control module 38 first executes instructions to determine the hood 18 is unsecured and that the vehicle 10 is about to be driven. Specifically, the control module 38 receives as input positional signals indicating the positions of both the retention member 40 and the detent lever 42. For example, the control module 38 receives positional signals from position switches (not shown in the figures). The control module 38 determines that the retention member 40 and the detent lever 42 are not engaged with one another and the hood 18 is lowered into the ajar position 20 but is unsecured based on the position signals. In response to determining the retention member 40 and the detent lever 42 are not engaged with one another, the control module 38 determines the latch assembly 30 is in the unlatched position seen in FIG. 9. The control module 38 then receives one or more signals indicating the vehicle 10 is either about to be driven. For example, the one or more signals may indicate that the vehicle 10 is being shifted out of the park (P) gear position. Alternatively, the one or more signals indicate that the vehicle 10 is operating at the threshold speed.

Figure 15:
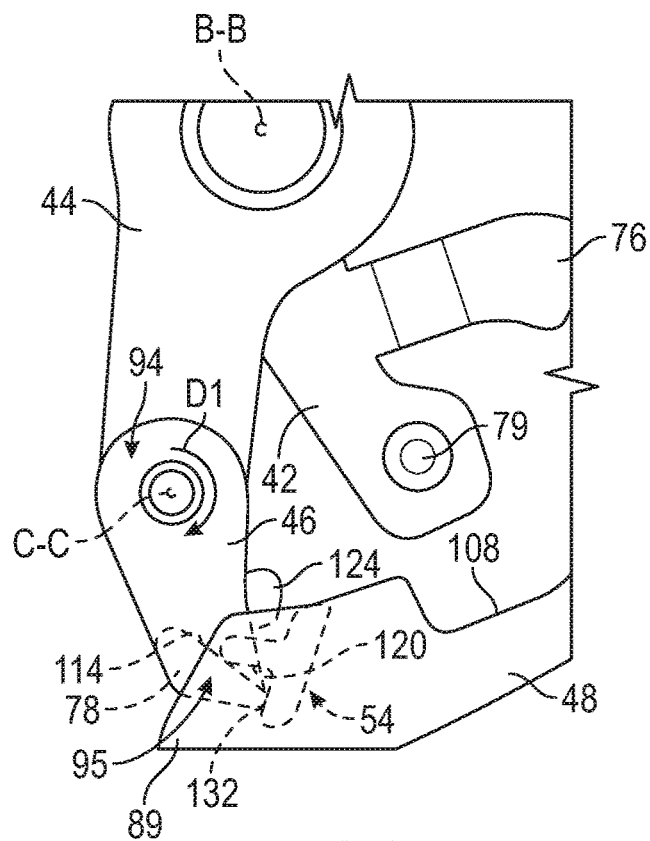
FIG. 15 is an enlarged view of the detent lever, the release lever, the coupling, and the memory lever, where the bypass feature of the coupling disengages with the memory lever according to an exemplary embodiment.

In response to determining the latch assembly 30 is in the unlatched position and that the vehicle 10 is about to be driven, the control module 38 instructs the actuator 36 to pull on the release cable 34 in the direction 100. Referring specifically to FIG. 9, the release lever 44 is pulled back and rotates in the second rotational direction D2. As the release lever 44 is pulled back, the coupling 46 is rotated about the axis C-C in the first rotational direction D1. FIG. 15 is an enlarged view of the coupling 46, the memory lever 48, and the linking member 79 of the detent lever 42 as the coupling is rotated about the axis C-C. Referring to both FIGS. 14 and 15, as the coupling 46 rotates, the second ramped surface 114 of the bypass feature 78 slides downwardly along the ledge 120 of the coupling feature 54 of the memory lever 48. The second ramped surface 114 than travels past a notch 130, and then contacts both the ledge 120 as well as a wall 132 of the bypass feature 78 of the memory lever 48. In the embodiment as illustrated, the ledge 120 and the wall 132 of the bypass feature 78 form an acute or a right angle with respect to one another.

Figure 16:
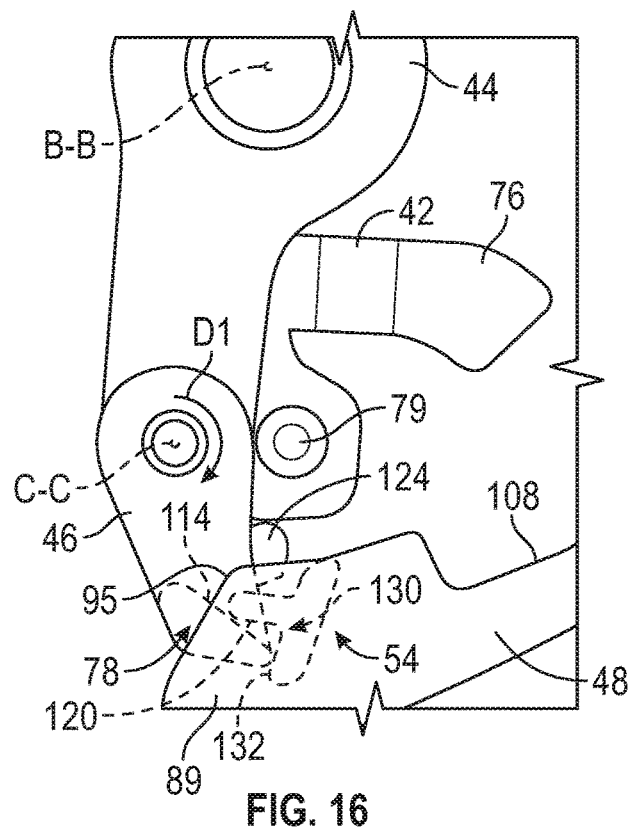
FIG. 16 enlarged view of the detent lever, the release lever, the coupling, and the memory lever.

The coupling 46 exerts a force upon the second end of the memory lever 48 as the bypass feature 78 of the coupling 46 moves within the coupling feature 54 of the memory lever 48. Exerting the force upon the second end 89 of the memory lever 48 causes the memory lever 48 to rotate about the pivot axis D-D in the first rotational direction D1 (the pivot axis D-D is visible in FIG. 9). As the memory lever 48 rotates about the pivot axis D-D, the linking member 79 of the detent lever 42 disengages with the lowered engagement surface 108 of the memory lever 48. Referring to FIGS. 15 and 16, once the linking member 79 of the detent lever 42 disengages with the memory lever 48, the detent lever 42 is now free to rotate about the axis B-B.

The detent lever 42 is now free to rotate in the first rotational direction D1 and back into the secondary position as seen in FIG. 7. As seen in FIG. 7, the catch 68 is engaged with the secondary shoulder 60 of the retention member 40. Furthermore, once the release lever 44 returns to the rest position by the release cable 34, the bypass feature 78 of the coupling feature 54 of the memory lever 48 completely disengages with the memory lever 48 coupling feature 54 of the memory lever 48. Therefore, the second end 95 of the coupling 46 is now free (FIG. 11). The latch assembly 30 is now back in the secondary position. Thus, the hood 18 (FIG. 1) may no longer be lifted up by airflow while the vehicle 10 is driven.

Referring generally to the figures, the disclosed latch assembly provides a simple, cost-effective approach for securing the hood of a vehicle. The disclosed latch assembly utilizes a floating coupling that interacts with a detent lever and a memory lever that allows for a single actuator to either fully release the latch assembly, partially release the latch assembly, or re-engage the latch assembly into the secondary position. That is, the disclosed latch assembly only requires a single actuator to engage and disengage the latch assembly. In contrast, conventional latch systems may require two separate actuators and drive circuits to release, partially release, and place the latch assembly in the secondary position, which in turn introduces additional weight and complexity to a vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A latch assembly having primary position, a secondary position, and an unlatched position, the latch assembly comprising:
   a striker;
   a retention member defining a retaining feature and a slot, wherein the slot of the retention member is shaped to receive the striker when the latch assembly is in the primary position, and wherein the retaining feature includes both a primary shoulder and a secondary shoulder;
   a detent lever defining a catch that is configured to engage with the secondary shoulder of the retaining feature of the retention member to secure the latch assembly in the secondary position, wherein the detent lever is rotatable about a shared axis of rotation;
a linking member coupled to the detent lever;
a memory lever moveable about a pivot axis, wherein the memory lever defines a coupling feature and a lower engagement surface configured to engage with the linking member when the latch assembly is in the unlatched position, and wherein engagement between the lower engagement surface of the memory lever and the linking member prevents the catch of the detent lever from engaging with the retaining feature of the retention member to actuate the latch assembly into the secondary position;
a release lever rotatable about the shared axis of rotation and operatively connected to the memory lever when the latch assembly is in the unlatched position, wherein rotation of the release lever about the shared axis of rotation when the latch assembly is in the unlatched position moves the memory lever about the pivot axis and urges the linking member out of engagement with the lower engagement surface of the memory lever to actuate the latch assembly into the secondary position, and wherein the release lever includes a first end, a second end, and an aperture disposed between the first end and the second end and at the shared axis of rotation; and
a coupling operably connecting the release lever to the coupling feature of the memory lever when the latch assembly is in the unlatched position, the coupling defining one or more bypass features, a first end, and a second end, wherein the first end of the coupling is rotatably connected to the second end of the release lever about an axis of rotation and the second end of the coupling is a floating end not permanently attached to another component of the latch assembly.

2. The latch assembly of claim 1, wherein the coupling feature of the memory lever is configured to disengage with the coupling as the latch assembly actuates from the unlatched position and into the secondary position.

3. The latch assembly of claim 1, wherein the second end of the coupling defines a bypass feature that is shaped to selectively engage with the memory lever.

4. The latch assembly of claim 1, wherein the detent lever defines a leg and the retention member defines a pin.

5. The latch assembly of claim 4, wherein the leg of the detent lever engages with the pin of the retention member as the latch assembly is actuated out of the primary position and into the secondary position.

6. The latch assembly of claim 1, wherein the memory lever defines an arcuate surface shaped to correspond with a sliding surface of the retention member.

7. The latch assembly of claim 6, wherein the arcuate surface of the memory lever engages with the sliding surface of the retention member when the latch assembly is in the primary position.

8. A latch assembly for securing a hood of a vehicle, the latch assembly having primary position, a secondary position, and an unlatched position, the latch assembly comprising:
a release cable;
a striker located along an underside of the hood of the vehicle;
a retention member defining a retaining feature and a slot, wherein the slot of the retention member is shaped to receive the striker when the latch assembly is in the primary position, and wherein the retaining feature includes both a primary shoulder and a secondary shoulder;
a detent lever defining a catch configured to engage with the secondary shoulder of the retaining feature of the retention member to secure the latch assembly in the secondary position, wherein the detent lever is rotatable about a shared axis of rotation;
a linking member coupled to the detent lever;
a memory lever moveable about a pivot axis, wherein the memory lever defines a lower engagement surface configured to engage with the linking member when the latch assembly is in the unlatched position, and wherein engagement between the lower engagement surface of the memory lever and the linking member prevents the catch of the detent lever from engaging with the retaining feature of the retention member to actuate the latch assembly into the secondary position;
a release lever connected to the release cable and rotatable about the shared axis of rotation, wherein the release lever is operatively connected to the memory lever when the latch assembly is in the unlatched position, wherein rotation of the release lever about the shared axis of rotation when the latch assembly is in the unlatched position moves the memory lever about the pivot axis and urges the linking member out of engagement with the lower engagement surface of the memory lever to actuate the latch assembly into the second position, and wherein the release lever includes a first end, a second end, and an aperture disposed between the first end and the second end of the release lever at the shared axis of rotation; and
a coupling operably connecting the detent lever to the release lever when the latch assembly is in the unlatched position, the coupling defining one or more bypass features, a first end, and a second end, wherein the first end of the coupling is rotatably connected to the second end of the release lever about an axis of rotation and the second end of the coupling is a floating end not permanently attached to another component of the latch assembly.

9. The latch assembly of claim 8, further comprising an actuator, wherein the release cable operably connects the actuator to the latch assembly.

10. The latch assembly of claim 9, further comprising a control module in electronic communication with the actuator.

11. The latch assembly of claim 10, wherein the control module executes instructions to:
receive as input one or more positional signals indicating a position of both the retention member and the detent lever;
determine that the retention member and the detent lever are not engaged with one another and the hood is lowered into an ajar position but is unsecured based on the one or more position signals; and
in response to determining the retention member and the detent lever are not engaged with one another, determine the latch assembly is in the unlatched position.

12. The latch assembly of claim 11, wherein the control module executes instructions to:
receives one or more signals indicating the vehicle is about to be driven;
determine the vehicle is about to be driven based on the one or more signals; and in response to determining the latch assembly is in the unlatched position and that the vehicle is about to be driven, instruct the actuator to pull on the release cable.

13. The latch assembly of claim 8, wherein the memory lever defines a coupling feature that is configured to selectively engage with the coupling.

14. The latch assembly of claim 13, wherein the coupling feature of the memory lever is configured to disengage with the coupling as the latch assembly actuates from the unlatched position and into the secondary position.

15. The latch assembly of claim 1, wherein the second end of the coupling include a bypass feature, and wherein the bypass feature of the coupling defines a first ramped surface and a second ramped surface.

* * * * *